(12) United States Patent
Greco et al.

(10) Patent No.: US 7,965,844 B2
(45) Date of Patent: Jun. 21, 2011

(54) SYSTEM AND METHOD FOR PROCESSING USER DATA IN AN ENCRYPTION PIPELINE

(75) Inventors: Paul Merrill Greco, Tucson, AZ (US); Shai Halevi, Elmsford, NY (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 11/688,445

(22) Filed: Mar. 20, 2007

(65) Prior Publication Data

US 2008/0253570 A1 Oct. 16, 2008

(51) Int. Cl.
*H04L 9/06* (2006.01)
*H04L 9/14* (2006.01)

(52) U.S. Cl. ............................ 380/277; 380/45; 713/193

(58) Field of Classification Search .................. 380/277, 380/45; 713/165, 193; 710/58; 726/1; 705/57
See application file for complete search history.

(56) References Cited

U.S. PATENT DOCUMENTS

| | | | |
|---|---|---|---|
| 5,442,699 A * | 8/1995 | Arnold et al. ................. | 713/188 |
| 6,347,145 B2 * | 2/2002 | Kato et al. .................... | 380/284 |
| 6,714,650 B1 * | 3/2004 | Maillard et al. .............. | 380/231 |
| 7,287,168 B2 * | 10/2007 | Candelore et al. ............ | 713/193 |
| 7,391,866 B2 * | 6/2008 | Fukami et al. ................ | 380/210 |
| 7,433,474 B2 * | 10/2008 | Kato et al. .................... | 380/284 |
| 7,681,048 B2 * | 3/2010 | Starr et al. .................... | 713/193 |
| 2001/0019615 A1 * | 9/2001 | Kato et al. .................... | 380/286 |
| 2002/0080972 A1 * | 6/2002 | Kato et al. .................... | 380/277 |
| 2002/0150239 A1 * | 10/2002 | Carny et al. ..................... | 380/37 |
| 2003/0095664 A1 * | 5/2003 | Asano et al. .................. | 380/277 |
| 2003/0231767 A1 | 12/2003 | Carbajal ....................... | 380/200 |
| 2005/0123142 A1 * | 6/2005 | Freeman et al. .............. | 380/277 |
| 2005/0135618 A1 | 6/2005 | Aslam et al. .................. | 380/212 |
| 2005/0180568 A1 | 8/2005 | Krause .......................... | 380/212 |
| 2005/0192904 A1 * | 9/2005 | Candelore ....................... | 705/51 |
| 2006/0150251 A1 * | 7/2006 | Takashima et al. ............. | 726/26 |
| 2008/0063206 A1 * | 3/2008 | Karp et al. .................... | 380/277 |
| 2008/0141291 A1 * | 6/2008 | Shieh ............................ | 720/718 |
| 2008/0253570 A1 * | 10/2008 | Greco et al. .................. | 380/277 |
| 2009/0070584 A1 * | 3/2009 | Heen et al. .................... | 713/168 |

* cited by examiner

*Primary Examiner* — Eleni A Shiferaw
(74) *Attorney, Agent, or Firm* — John H. Holcombe (57) ABSTRACT

A method, system and program are disclosed for efficiently processing host data which comprises encrypted and non-encrypted data and is to be written to a storage medium. The encrypted data is written to the storage medium in encrypted form. The non-encrypted data is encrypted by a storage device using a well known encryption key and written to the storage medium. In this way, the data that is processed by the storage device to and from the storage medium can always be processed through a single encryption engine.

11 Claims, 6 Drawing Sheets

SYSTEM AND METHOD FOR PROCESSING USER DATA IN AN ENCRYPTION PIPELINE

DOCUMENT INCORPORATED BY REFERENCE

Commonly assigned U.S. patent application Ser. No. 11/530,011, Greco et al., "Encryption Policy Based on Data Context Recognition", is incorporated for its showing of data context recognition for the purpose of encryption.

BACKGROUND

1. Field

The present disclosure relates to a method, system, and program for encrypting and decrypting data on a data storage device.

2. Description of the Related Art

Protecting and securing data is one of the primary concerns that must be addressed when designing an information management system, whether for a single user, small business or large scale data warehouse. Oftentimes, data may be continually archived on various storage media, such as tape cartridges, optical disks, disk drives, and the like. When archiving data on such storage media, one security concern is that a storage medium may be lost or stolen, and sensitive data on the storage medium may be discovered. Also, if the storage medium can be accessed through remote commands transmitted over a network, then there is a concern that someone may "hack" into the system to gain access the data.

To address some of these problems, many companies encrypt data written on the storage media. In such a case, if the storage media were to become lost or stolen, the data thereon would not be readily accessible because it would be encrypted. However, while encrypting data works well to secure the data, the process of encrypting and decrypting the data on the storage media introduces challenges, particularly when both encrypted and non-encrypted data are to be written on the storage media.

As an example, an application may desire to write both encrypted data and non-encrypted data on a storage medium. However, mixing of encrypted and non-encrypted data on the storage medium requires the management of, and processing of, both encrypted and non-encrypted data. Conventional systems have addressed this problem by writing the encrypted and non-encrypted data on the storage medium in encrypted and non-encrypted forms, respectively. However, reading and writing both encrypted and non-encrypted data requires interruptions in the data stream in order to process the different types of data, as the encrypted data must be processed through an encryption engine, and the non-encrypted data is not processed through the encryption engine. Reading/Writing a stream of data through the encryption engine must be stopped in order to process a stream of non-encrypted data, and then the encryption engine restarted again to read/write the encrypted data. Processing the data in this way is inefficient and impacts the overall time to read and write data from and to a storage medium.

In view of the foregoing, there is a need in the art for improved encryption schemes when processing application data which includes both encrypted and non-encrypted data to be written to and read from a storage medium.

SUMMARY

A tape cartridge system and method are provided for receiving data from a host application to be written to a storage medium, said data comprising first data and second data, encrypting said first data on said storage medium using a first data key to produce first encrypted data, writing said first encrypted data to said storage medium, encrypting said second data with a well known key to produce second encrypted data, and writing said second encrypted data on said storage medium.

BRIEF DESCRIPTION OF THE DRAWINGS

Selected embodiments of the present disclosure may be understood, and its numerous objects, features and advantages obtained, when the following detailed description is considered in conjunction with the following drawings, in which.

DETAILED DESCRIPTION

A method, system and program are disclosed for efficiently processing host data which comprises encrypted and non-encrypted data. For aiding in the description herein, "user data" is used to refer to data which is provided by a host application and the host application does not explicitly request the data be encrypted, while "application data" is used to refer to data which is provided by a host application and the host application explicitly requests the data be encrypted (e.g., by a tape drive), or alternatively provides the data in encrypted form. By way of example, a host application may transfer data to a storage system for storage on a tape cartridge. Further, it may be the case that certain portions of the data are encrypted by the application (or requested to be encrypted when stored) (i.e., "application data"), while other portions of the data are not encrypted, at least from the perspective of the application (i.e., "user data"), when stored. The method, system, and program disclosed herein processes this mix of encrypted and non-encrypted data by encrypting the user data on the storage medium, resulting in both the application data and the user data written in encrypted form to the storage medium.

This is accomplished in the following way: the user data is encrypted with an encryption key known locally to the tape drive (e.g., a zero key), herein called a "well known key", and the application data is encrypted using encryption keys provided by the application (or a corresponding key store associated with the encryption policy of the application). As a result, the data provided by the application, both application data and user data, is stored on the tape cartridge in encrypted form.

This solution of encrypting the user data with a well known key, even though the application did not explicitly request the data to be encrypted, is advantageous. For example, it allows the reading and writing of data to the storage media to be processed in one encryption read/write path, utilizing the encryption/de-encryption engine, as opposed to separate encryption and non-encryption read/write paths. This allows for a more efficient process of reading and writing data to the storage media with fewer interruptions to process the different types of data. Additionally, by using a well known key to encrypt the user data, the user data is encrypted, yet widely accessible as it may be accessed via a number of applications via the well known key, all without comprising the application data.

Various illustrative embodiments will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block or blocks of the block diagram. In addition, while various details are set forth in the following description, it will be appreciated that the embodiments may be practiced without these specific details, and that numerous implementation-specific decisions may be made to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. In addition, some portions of the detailed descriptions provided herein are presented in terms of algorithms or operations on data within a computer memory. Such descriptions and representations are used by those skilled in the art to describe and convey the substance of their work to others skilled in the art. For example, the storage device may be a tape drive, optical drive, disk drive controller, USB drive controller, and the like. The storage medium may be a tape cartridge, optical disk, disk drive, USB storage device, and the like. For simplicity, the description provided herein is provided with respect to a tape drive and a tape cartridge as the respective storage device and storage medium. One of ordinary skill in the art will recognize that these concepts apply to other storage devices and storage media. Various illustrative embodiments will now be described in detail below with reference to the figures.

Figure 1:
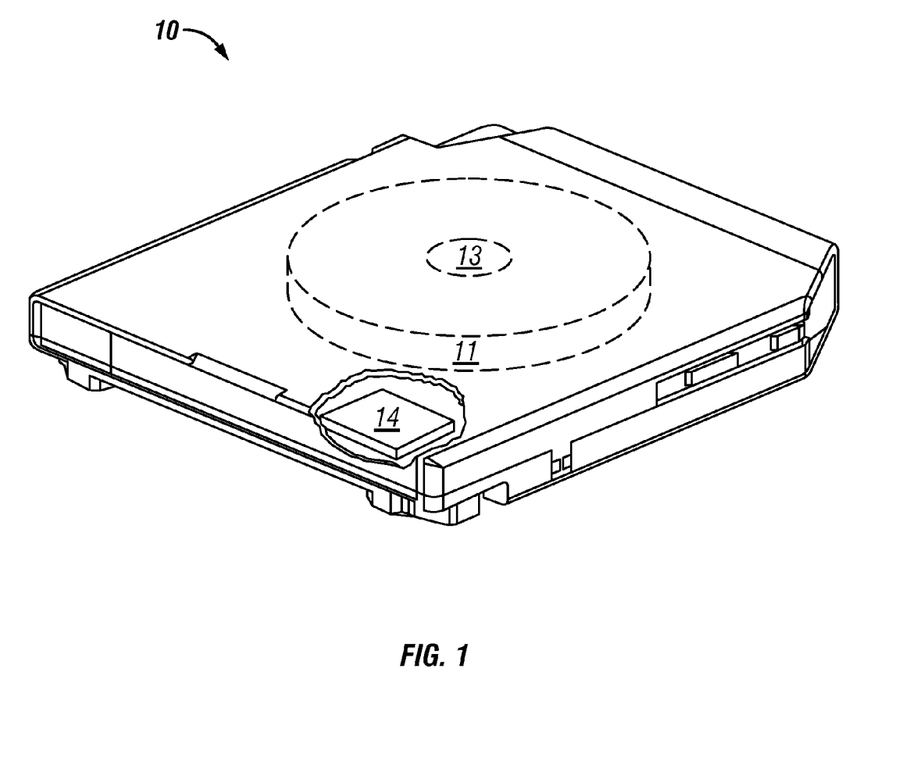
FIG. 1 illustrates a data storage cartridge with a cartridge memory and a tape medium.

Referring to FIG. 1, a data storage cartridge 10 is illustrated which includes a non-volatile read/writable cartridge memory (CM) circuit 14 (shown in cutaway) and a rewritable storage medium 11, such as a high capacity single reel of magnetic tape (shown in phantom) wound on a reel 13. The cartridge memory 14 is a passive storage device that includes a transponder that provides a contactless interface, and is used to hold information about that specific cartridge, the medium in the cartridge, and the data on the medium. Examples of magnetic tape cartridges are a cartridge based on LTO (Linear Tape Open) technology, such as the IBM TotalStorage LTO Ultrium Data Cartridge, and a cartridge based on IBM's 3592 technology, such as the IBM 3592 Enterprise Tape Cartridge. As will be appreciated, the tape cartridge 10 may be a magnetic tape cartridge having dual reel cartridges (in which the tape is fed between reels within the cartridge) or single reel cartridges, such as illustrated in FIG. 1, in which the medium 11 is wound on a reel 13 within the cartridge 10. For example, when the cartridge 10 is loaded into a tape drive, the tape is fed between the cartridge reel and a take up reel (not shown) located in the tape drive. While exemplary tape cartridges based on the LTO and 3592 formats have been provided, it will be appreciated that the description is not limited by tape format. Examples of other tape formats include DLT, SDLT, 9840, 9940, T10000, AIT, and the like.

Figure 2:
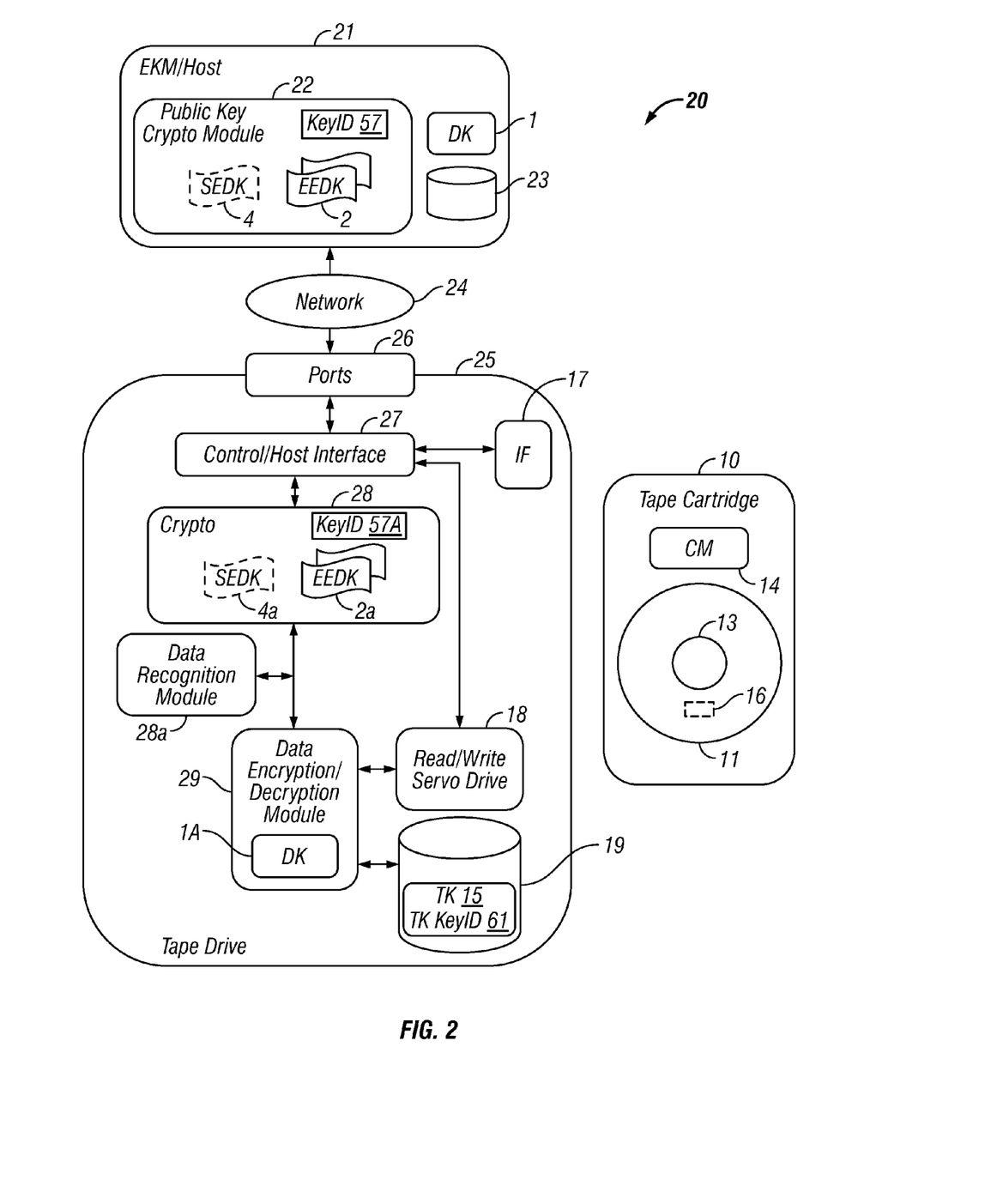
FIG. 2 is a generalized block diagram of a computing environment in which a tape cartridge and tape drive are implemented.

Referring to FIG. 2, a computing environment is illustrated in which a tape cartridge 10 and tape drive 25 are implemented in combination with an external key manager (EKM) 21 as a cartridge handling system 20. It will be appreciated that the external key manager may be a host computer, a key management application, or the like. One example implementation of such a cartridge handling system 20 would be a magnetic tape data storage system formed from the combination of an IBM 3592 Model E05 Encrypting Tape Drive and the IBM 3592 Enterprise Tape Cartridge subsystem.

In the illustrated example, the EKM/host system 21 includes a host application (not shown), such as a backup and/or archive application, that transfers data to the tape drive 25 to sequentially write to the tape cartridge 10, such as by using the Small Computer System Interface (SCSI) tape commands to communicate I/O requests to the tape drive 25, or any other data access command protocol known in the art. In addition, the EKM/host 21 includes data key generator functionality for generating a data key 1 for use in encrypting portions of the application data. The EKM/host may also comprise KeyID generator functionality and database or keystore 23 to associate a key identifier KeyID 57 with a matching data key 1. Alternatively, a key wrapping functionality may be employed to generate externally encrypted data key(s) EEDKs 2. The EKM/host 21 may also comprise a public key crypto module 22 that is used to generate a session encrypted data key (SEDK) 4 from the data key 1, and then to securely pass the SEDK 4 to the tape drive 25 as part of a secure key exchange. The crypto module 22 may alternatively or additionally pass the EEDK 2 and/or KeyID 57 to the tape drive 25. Herein, the encryption/decryption functionality may be termed an "engine" or "module".

The tape drive 25 may connect with the host 21 through a direct interface (such as an SCSI, Fibre Channel (FCP), etc., in the case if the tape drive 25 is connected to the host 21) or may connect over a network 24 (such as a Local Area Network (LAN), Storage Area Network (SAN), Wide Area Network (WAN), the Internet, an Intranet, etc.). It will be appreciated that the tape drive 25 may be enclosed within the host system 21 or may be a standalone unit or may be within a tape library system (e.g., tape library 101 of FIG. 6), As illustrated, the tape drive 25 includes a memory circuit interface 17 for reading information from, and writing information to, the cartridge memory 14 of the data storage cartridge 10 in a contactless manner. In addition, a read/write servo drive system 18 is provided for reading information from, and writing information to, the rewritable tape media 11. The read/write servo drive system 18 controls the movement of a servo head (not shown) relative to the magnetic tape media 11 by moving the magnetic tape media 11 across at a desired velocity, and stops, starts and reverses the direction of movement of the magnetic tape.

A controller 27 in the tape drive 25 communicates with the memory interface 17 and the read/write system servo drive 18. To receive commands and exchange information for operating the cartridge handling system 20, the controller 27 also acts as a host interface to communicate over one or more ports 26 with one or more external key management (EKM) subsystems 21 (such as a host computer, library or external key management appliance). In addition, a crypto module 28 and data encryption/decryption module 29 are provided in the tape drive 25 for securely encrypting and storing data to the tape cartridge 10 and for securely retrieving and decrypting data stored on the tape cartridge 10. A database 19 may be provided in the tape drive 25 to provide a tape drive key (TK)

15 for use by the crypto module 28 and the data encryption/decryption module 29 in encrypting non-encrypted application data written on tape cartridge 10. Alternatively, the tape drive key TK 15 may be hardcoded into the crypto module 28. A data recognition module 28a determines whether or not data provided by the host application is user data or application data. The EKM/Host 21 may also explicitly direct the tape drive 25 to write non-encrypted data, in which case crypto module 28 determines that the TK 15 be employed for writing the data. A TK KeyID 61 may be employed to identify the tape drive key 15.

The tape drive key TK 15, in one embodiment, comprises a "zero key", in which all bytes are zero.

In operation, the tape drive 25 provides for efficiently processing user data and application data on tape cartridge 10 by encrypting the user data with tape drive key TK 15 and encrypting the application data with data key DK 1A. In this way, the read and write process does not have to be interrupted with reading and writing of encrypted and non-encrypted data, and the encryption of both may be conducted by the same module, as may the decryption.

The data encryption/decryption module 29 performs the actual data encryption and decryption (such as by using the Advanced Encryption Standard encryption algorithm) using a data key having any desired key length (e.g., 128 or 256-bit data key length), and may also perform other encoding functions, such as data compression and decompression and data buffering. The crypto module 28 controls the data encryption/decryption module 29 by obtaining the keys necessary for the desired encryption. For example, in the case of encrypting application data, crypto module 28 may control the data encryption/decryption module 29 by securely exchanging the session encrypted data key (SEDK) 4a with the EKM 21. The data key DK 1A is extracted from the SEDK 4a at the crypto module 28 and is sent to the data encryption/decryption module 29 where the data key DK 1A is used to encrypt/decrypt the input data stream of application data. The crypto module 28 may also assemble, validate, distribute, store and retrieve one or more associated encryption encapsulated data keys (EEDKs) 2a (the letter suffix "a" in the reference numeral "2a" indicates that the EEDKs 2 and 2a are logically identical, though physically distinct copies). In the case of encrypting user data, the crypto module 28 obtains the tape drive key TK from database 19 or it may be hardcoded into the crypto module 28.

While the modules 28, 29 may be implemented with any desired combination of hardware and/or software, the data encryption/decryption module 29 may be implemented with an ASIC or FPGA circuit, while the crypto module 28 may be implemented with one or more drive firmware modules that include a microprocessor and microcode stored in a code memory.

As described herein, the cartridge handling system 20 performs a variety of functions, including but not limited to, encrypting data to be stored on the cartridge 10 using the appropriate data key (such as an AES encryption key). In the case of encrypting application data, the data key may come from EKM/Host 21. In the case of encrypting user data, the data key may be a zero key. In this way, the cartridge handling system 20 provides an encryption process which allows both application and user data to be stored on tape cartridge 10 in encrypted form, which in turn, allows for efficient reading and writing of the data to and from the tape cartridge 10.

Figure 3:
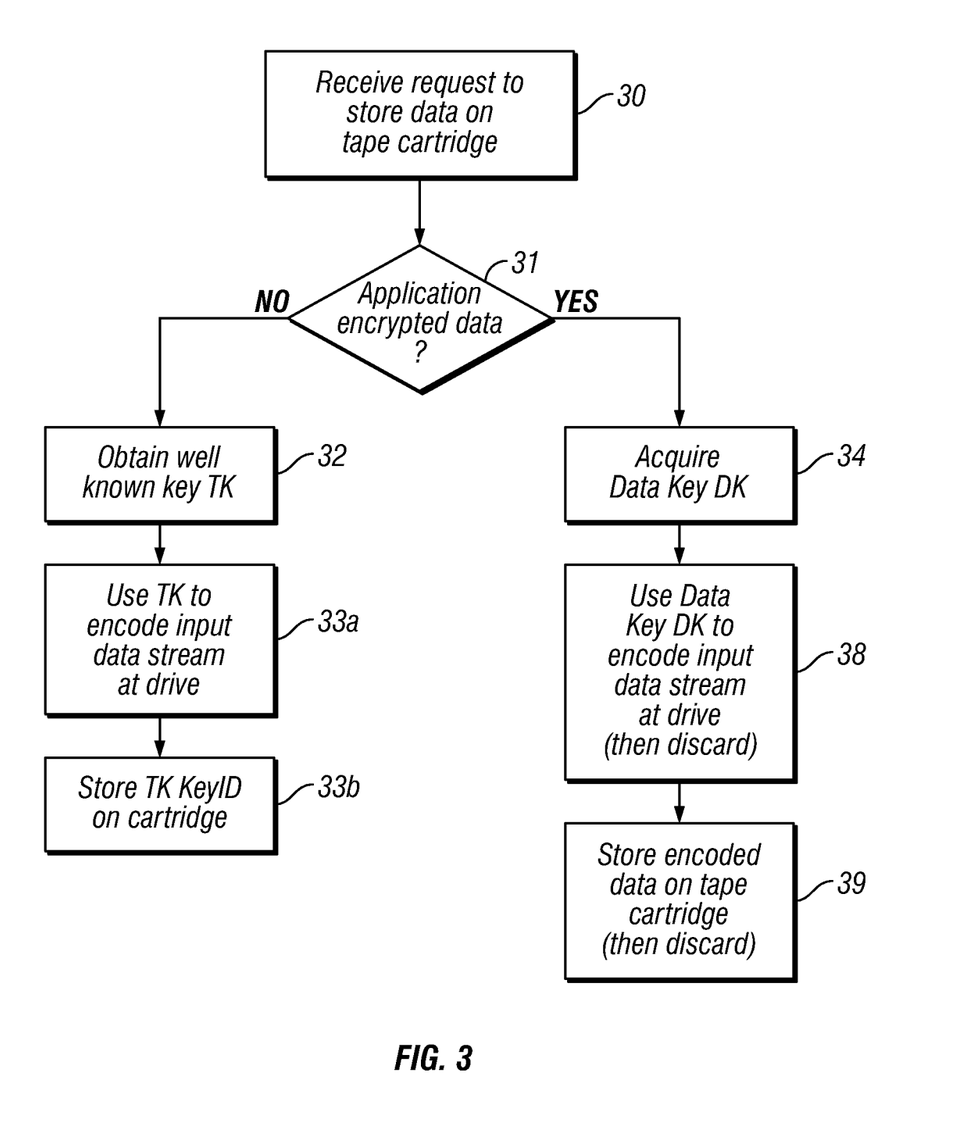
FIG. 3 is a logical flowchart of the steps used to encode and store data.

To illustrate the writing of application data and user data on tape cartridge 10, the process flow depicted in FIG. 3 is now described with reference to the cartridge handling system 20 depicted in FIG. 2. Initially, when a request is received to store data on the tape cartridge 10 (step 30), a determination is made whether the data is to be encrypted or not. The determination may be resolved by explicit direction, or automatically by the tape drive 25 by data context recognition module 28a, thus determining whether the data is application data or user data (step 31). (A description of data context recognition module 99 is provided in U.S. patent application Ser. No. 11/530,011, incorporated herein by reference.)

If the data to be written is user data, the user data is encrypted using a well known key. As such, crypto module 28 obtains the tape drive key TK 15, for example from the database 19, for use as the encryption key (step 32). In the presently described embodiment, TK 15 is a zero key, however one of ordinary skill in the art will recognize that any key such as a symmetric AES key or asymmetric key having any desired key length (e.g., 128 or 256-bit data key length) which is used to encrypt data may be used, provided that all the systems which desire access to the user data in encrypted form have knowledge of the key TK 15. Upon obtaining the TK 15, the crypto module 28 provides the TK 15 to data encryption module 29 to encode the input data stream of user data (step 33a). The tape drive 25 may also store a unique TK KeyID 61 representing the usage of the TK 15 in one more non-user data areas 58, 16 of tape 11 (step 33b). Alternatively, the tape drive key TK 15 could be stored in a non-user data area.

Referring back to the decision step 31, if the data from the application is application data, then the application data is encrypted and stored on tape cartridge 10 as follows. Initially, the data key DK 1 is acquired from the EKM 21 (step 34) and is then made available to the tape drive 25 before the write process begins. Generally, a KeyID 57 or a wrapped key (i.e., encryption encapsulated data key (EEDK 2)) is also provided and forms an association or other mechanism to retrieve the data key DK 1 at a future time. A secure key exchange may be used to transfer the DK 1 in encrypted form to the tape drive 25.

At this time, the drive 25 uses the data key DK to encode the data stream (step 38). In one example, a secure key exchange may be established to encrypt the data key DK 1 with a session key (e.g., the public key from the tape drive 25), thereby generating a session encrypted data key 4 (SEDK) which can be securely passed, along with the EEDK(s) 2 or a KeyID 57, to the tape drive 25. Once the EKM/Host 21 sends the encrypted data keys to the tape drive 25, the data key 1 and encrypted data key(s) 2, 4 may be discarded by the EKM 21. As will be appreciated, there are several methodologies which may be used for secure key exchanges, including wrapping the data key 1 in a session key from the drive 25, though other techniques may be used, including but not limited to RSA, Diffie-Hellman (DH), elliptic curve Diffie Hellman (ECDH), Digital Signature Algorithm (DSA), elliptic curve DSA (ECDSA), etc.

Upon transfer to the tape drive 25, the EEDK(s) 2a, KeyID 57A and the SEDK 4a are stored in the crypto module 28. If a KeyID 57A is not provided, one is generated by the crypto module 28 that is different than the TK KeyID 61 which identifies the use of the tape drive key TK 15. The tape drive 25 decrypts the SEDK 4a with its private session key to produce the data key 1A which is used to set up the encryption hardware module 29. At any point after the encryption hardware module 29 is set up, the SEDK 4a may be discarded from the tape drive (step 38). Once the input data stream is encrypted, the tape drive 25 writes the encoded data to the tape 11, and discards the data key 1A (step 39). Once the encoded data and EEDK(s) are stored to the tape cartridge 10, the tape drive 25 discards the encoded data and the EEDK(s)

(step 39). As can be seen from the above description and FIG. 2, both the user data and application data are processed through one write path to tape cartridge 10, rather than separate paths for encrypted data and non-encrypted data.

Figure 4:
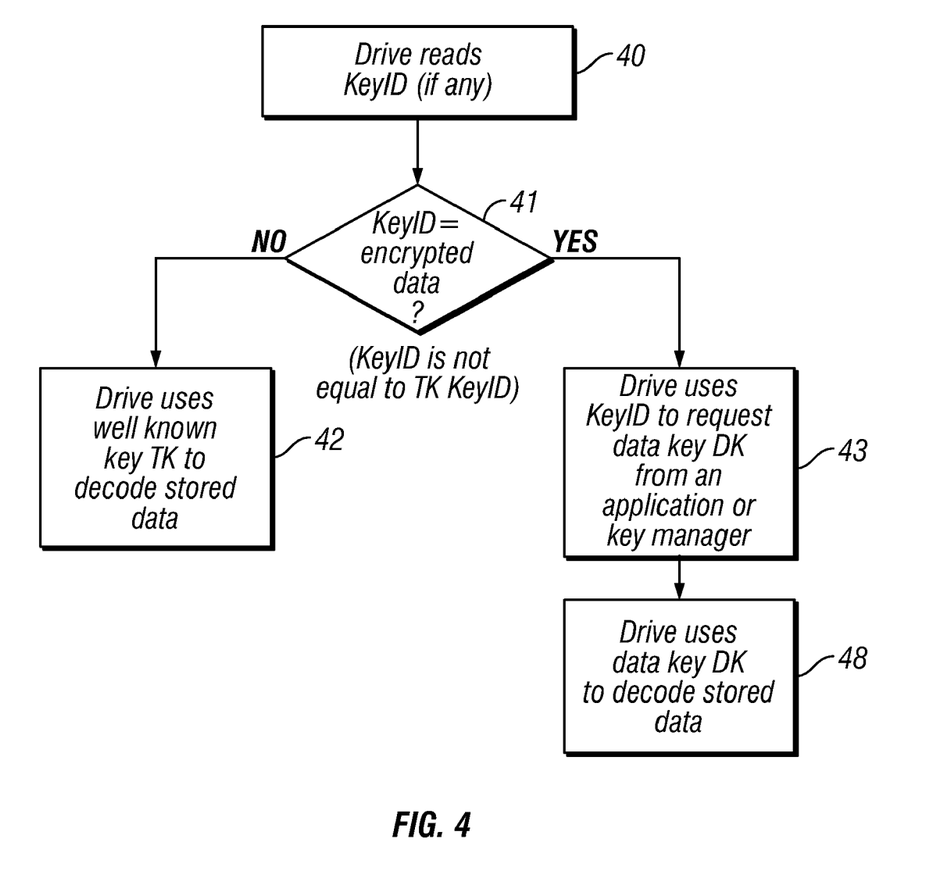
FIG. 4 is a logical flowchart of the steps used to read and decode stored data.

Following the example of data on tape cartridge 10, an example of how reading the data is now provided. Specifically, the process flow of FIG. 4 depicts how data may be securely decoded and read from a removable tape cartridge and is described with reference to the cartridge handling system 20 depicted in FIG. 2. During the tape cartridge load process, the tape drive 25 recognizes that a tape 11 has encrypted data on it by detecting the existence of KeyIDs, EEDKs or other control indicators on the tape cartridge 10 (step 40). This may be done by tape drive 25 reading the KeyIDs and/or EEDKs from cartridge memory 14 and/or by reading and verifying the KeyIDs and/or EEDKs from a non-user data area 16 of tape 11.

In the presently described embodiment, areas of tape 11 are grouped according to records having corresponding control information describing characteristics of the record, including a KeyID 100 for the record if the record is encrypted. The KeyID 100 may comprise the KeyID 57 for application data, or TK KeyID 61 for user data or an absence of a KeyID may indicate user data. Accordingly, when read processing each record of tape 11, the KeyID 100 for each record is read (step 40) and crypto module 28 determines whether the KeyID 100 has a value equal to TK KeyID 61 associated with TK 15 (e.g. a value of zero) (step 41). If the KeyID indicates the record was encrypted using TK 15, TK 15 is used to decode and read the data in that record (step 42). Alternatively, tape drive key TK 15 may be stored directly instead of or along with a TK KeyID 61, so long as it may be differentiated from an externally provided KeyID 57.

If the KeyID is not associated with TK 15, then the key to decode the data is obtained by using the KeyID or by associated EEDKs. Initially, crypto module 28 determines the EEDKs corresponding to the KeyID 57, if any, or resolves the data key (DK) needed to decrypt the data via some other means (step 43). In one embodiment, this may be done by requesting or performing key exchange involving a lookup of KeyID 57 in a database or keystore 23 maintained at the point of DK 1 generation. In an alternative embodiment, this may be done at the tape drive 25 by reading the EEDK(s) 2b from database 19.

The generated or extracted data key(s) DK are then employed to decode the stored data (step 48). Once used, the data key(s) may be discarded.

Figure 5:
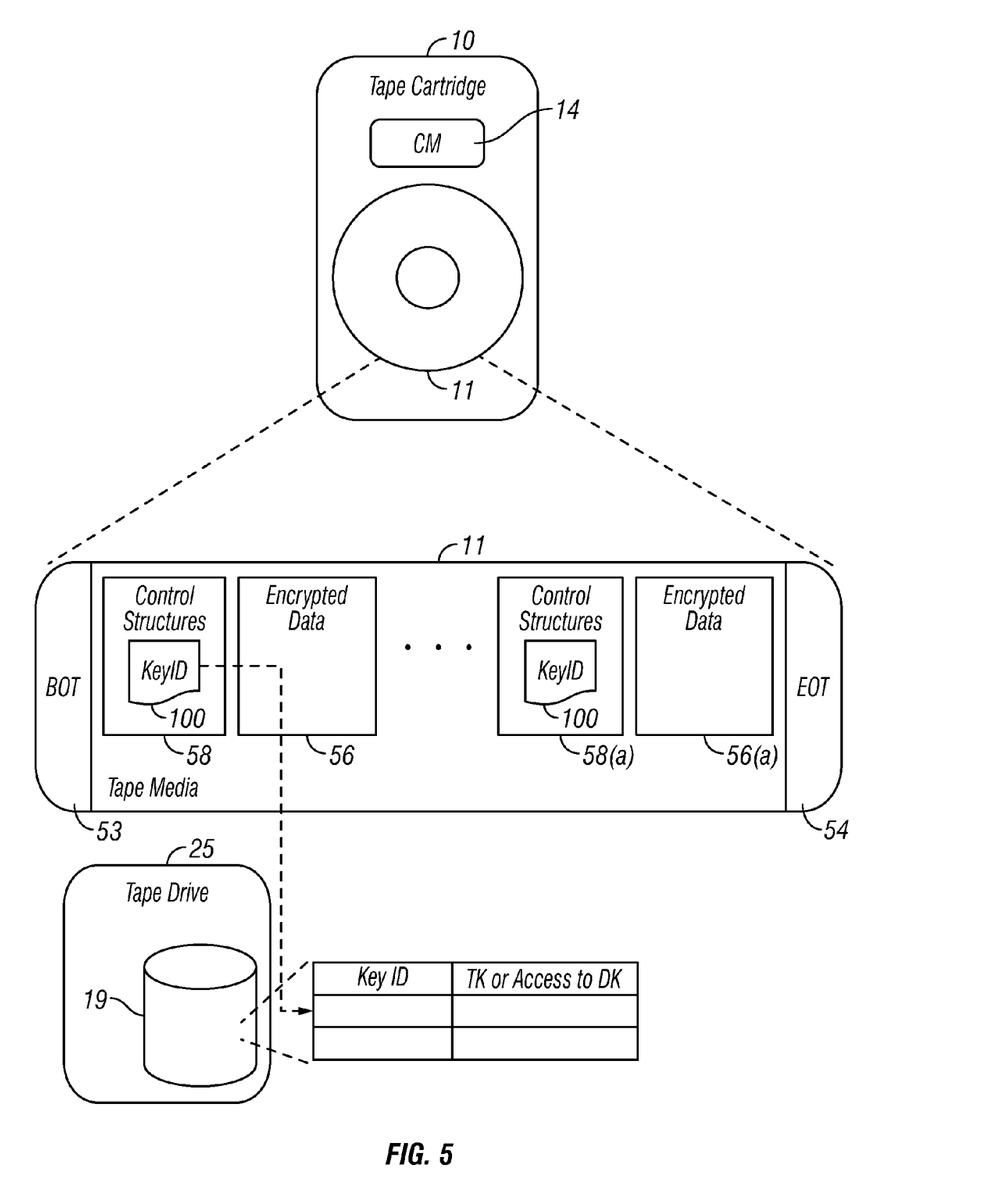
FIG. 5 is a block diagram illustration of the medium format elements of the magnetic tape medium in a tape cartridge.

An example implementation of how KeyIDs are stored is depicted in FIG. 5, which depicts a tape cartridge 10 having a cartridge memory 14 and a magnetic tape medium 11 and which shows the medium format elements of the magnetic tape medium 11. With reference to an illustrative implementation in which the tape medium uses an LTO tape format, the length of a magnetic tape 11 is divided into regions of the tape, such as beginning of tape (BOT) region 53 and the end of tape (EOT) region 54, respectively. Additional non-user regions include a servo acquisition area, a calibration area that includes different information in the different bands, and the regions which include the servo acquisition region for reverse wraps. Thus, the magnetic tape 11 layout includes non-user areas 53 and 54. The magnetic tape 52 layout also includes user data regions 55 in which the encrypted data 56 is stored. Of course, different tape formats may be used other than LTO formats where such formats provide for user data areas 55 that are separately delineated from non-user data areas 53, 54.

As illustrated in FIG. 5, the KeyIDs 57 may be stored in logical format data set regions such as Data Set Information Tables (DSITs), or be encoded into the recording stream itself 58 before the associated encrypted data 56 of the tape medium 52 that are designed for holding this type of information, or in other areas such as the tape regions before the User Data area (i.e. before LP3) or after it (i.e. after LP4). In the present embodiment, for each encrypted record 56 stored in the tape 52, an internal control storage area 58 is provided which allows the storage of KeyIDs 57. Alternatively or additionally, the KeyIDs 57 may exist in the cartridge memory 11, or may be external to the drive.

Figure 6:
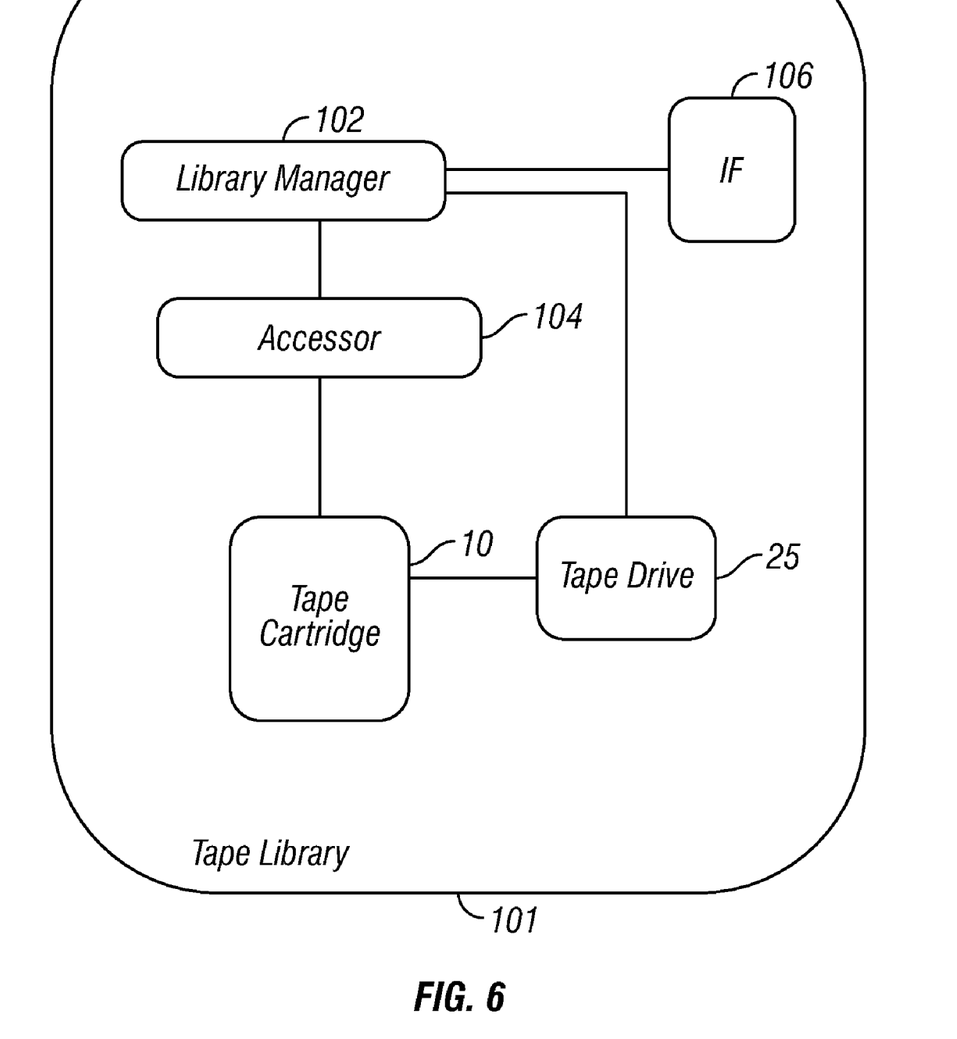
FIG. 6 is a block diagram illustration of a tape library which includes tape drives and tape cartridges of FIG. 2.

FIG. 6 represents an exemplary Tape Library 101, including library manager 102, one or more accessors 104, one or more tape drives 25 and one or more tape cartridges 50, and interface 106. In general, tape cartridges 50 are stored in storage bins (not show), and transferred between the storage bins and tape drives 25 by accessor 104, under the control of library manager 102. The library manager 102 communicates with host applications via interface 106. As described above, the host applications transfer data to and from tape library 101 for the storage of data on tape cartridges 50.

As will be appreciated by one skilled in the art, the present invention may be embodied in whole or in part as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. For example, the functions of tape drive 25 and tape cartridge 10 may be implemented in software commonly referred to as a virtual tape library. The virtual tape library software may communicate with EKM/Host 21 and mimic the functions of a physical tape library, including the functions of reading from and writing to a storage device such as a tape drive. The virtual tape library software may reside on a separate computer system, coupled to EKM/host 21.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for writing encrypted data and non-encrypted data on a storage medium, comprising:

receiving data from a host application to be written to said storage medium, said data comprising first data to be encrypted, and second data not requested to be encrypted;

in one write path, encrypting by an encryption engine, said first data using a first data key to produce encrypted data;

in said one write path, applying by said encryption engine, a zero key to said second data to provide said data as encrypted in form only; and writing said first and said second data on said storage medium in encrypted form.

2. The method of claim 1, wherein said storage medium is a tape cartridge.

3. The method of claim 1, further comprising:
determining whether said data is to be encrypted data comprising said first data, or non-encrypted data comprising said second data.

4. The method of claim 3, further comprising:
if said data is said second data:
  obtaining said zero key from a tape drive key source;
  encoding said second data with said zero key; and
  writing said encoded data on said storage medium.

5. The method of claim 3, further comprising:
if said data is said first data:
  acquiring said first data key from an encryption key manager;
  encoding said first data with said first data key; and
  writing said encoded data on said storage medium.

6. A data storage system comprising:
a read/write drive for reading data from and writing data to a storage medium housed in a data storage cartridge configured to be loaded in said data storage drive; and
a controller having one write path with an encryption engine, coupled to the read/write drive that is configured to:
receive data from a host application to be written to said storage medium, said data comprising first data to be encrypted, and second data not requested to be encrypted;
encrypt, in said one write path by said encryption engine, said first data using a first data key to produce encrypted data;
apply, in said one write path by said encryption engine, a zero key to said second data to provide said data as encrypted in form only; and
provide said first and second data to said read/write drive for writing on said storage medium in encrypted form.

7. The data storage system of claim 6, wherein said data storage system is a tape library.

8. The data storage system of claim 6, wherein said storage medium is a tape cartridge.

9. The data storage system of claim 6, wherein said controller is further configured to:
determine whether said data is to be encrypted data comprising said first data, or non-encrypted data comprising said second data.

10. The data storage system of claim 9, wherein said controller is further configured to:
if said data is said second data:
  obtain said zero key from a tape drive key source;
  encode said second data with said zero key; and
  write said encoded data on said storage medium.

11. The data storage system of claim 10, wherein said controller is further configured to:
if said data is said first data:
  acquire said first data key from an encryption key manager;
  encode said first data with said first data key; and
  write said encoded data on said storage medium.

* * * * *